United States Patent
Schreter (10) Patent No.: US 8,819,074 B2
(45) Date of Patent: Aug. 26, 2014

(54) REPLACEMENT POLICY FOR RESOURCE CONTAINER

(71) Applicant: Ivan Schreter, Malsch (DE)

(72) Inventor: Ivan Schreter, Malsch (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 14/065,002

(22) Filed: Oct. 28, 2013

(65) Prior Publication Data

US 2014/0059082 A1  Feb. 27, 2014

Related U.S. Application Data (63) Continuation of application No. 13/169,925, filed on Jun. 27, 2011, now Pat. No. 8,572,130.

(51) Int. Cl.
  G06F 17/30  (2006.01)

(52) U.S. Cl.
  USPC ........... 707/799; 707/813; 711/113; 711/118; 711/129

(58) Field of Classification Search
  CPC ................... G06F 17/30044; G06F 17/30064; G06F 12/0246; G06F 3/0652; G06F 5/065; G06F 9/3855
  USPC .......... 707/662, 663, 813, 799; 711/113, 118, 711/129, 130
  See application file for complete search history.

(56) References Cited

U.S. PATENT DOCUMENTS

| | | | |
|---|---|---|---|
| 5,787,473 A | 7/1998 | Vishlitzky et al. | |
| 5,974,509 A * | 10/1999 | Berliner | 711/135 |
| 6,338,112 B1 * | 1/2002 | Wipfel et al. | 710/269 |
| 6,353,898 B1 * | 3/2002 | Wipfel et al. | 714/48 |
| 6,374,339 B2 * | 4/2002 | Iivonen | 711/170 |
| 6,397,228 B1 * | 5/2002 | Lamburt et al. | 707/692 |
| 6,715,039 B1 | 3/2004 | Michael et al. | |
| 6,834,329 B2 * | 12/2004 | Sasaki et al. | 711/134 |
| 7,519,776 B2 * | 4/2009 | Naryzhny et al. | 711/133 |
| 8,117,396 B1 * | 2/2012 | Fair et al. | 711/133 |
| 2001/0021964 A1 * | 9/2001 | Iivonen | 711/154 |
| 2005/0055512 A1 * | 3/2005 | Kishi | 711/135 |
| 2005/0268044 A1 * | 12/2005 | Arcas | 711/133 |
| 2012/0331019 A1 | 12/2012 | Schreter | |

* cited by examiner

*Primary Examiner* — Phong Nguyen

(74) *Attorney, Agent, or Firm* — Buckley, Maschoff & Talwalkar LLC

(57) ABSTRACT

A system includes creation of a first resource queue indicating an order of resources stored in a memory, the order based on respective timestamps associated with the stored resources, association of the first resource queue with a first queue timestamp, reception of a first command to deallocate a first amount of stored resources from the memory, determination that a first stored resource indicated by the first resource queue is associated with a timestamp earlier than the first queue timestamp, deallocation of the first stored resource from the memory, reception of a second command to deallocate a second amount of stored resources from the memory, determination that the first resource queue indicates no stored resources which are associated with a timestamp earlier than the first queue timestamp, and, in response to the determination that the first resource queue indicates no stored resources which are associated with a timestamp earlier than the first queue timestamp, creation of a second resource queue indicating a second order of second resources stored in the memory, the second order based on respective second timestamps associated with the stored second resources.

14 Claims, 7 Drawing Sheets

FIG. 5B

REPLACEMENT POLICY FOR RESOURCE CONTAINER

FIELD

Some embodiments relate to database systems. In particular, some embodiments concern deallocation of cached resources within a database system.

BACKGROUND

A conventional database system uses a datastore to persistently store data pages, and a cache to provide fast access to the data pages. For example, in response to a request to access a data page, the data page is loaded from the datastore into the cache, and may thereafter be accessed from and/or modified within the cache. Once the data stored in the cache reaches a maximum allowed size, data pages are deallocated from the cache according to a replacement policy. For example, a replacement policy may result in deallocation of the oldest data pages in the cache until the data stored in the cache is of an acceptable size.

A modern in-memory database system uses volatile memory (e.g., Random Access Memory) for its cache and for persistent storage. Accordingly, it may be advantageous to selectively increase or decrease the cache size based on competing needs of the database system. A replacement policy is also required in order to deallocate cached data pages so that the maximum cache size may be decreased to a desired level.

Many types of replacement policies exist. A least-recently used (LRU) policy may, for example, maintain a linked list of all cached data pages. The list is ordered based on the time at which each page was last used. For example, the least-recently used page is located at the end of the list, while the most-recently used page is located at the beginning of the list. If a command is received to free a particular amount of cache space, a number of data pages having a total size equal to or greater than the particular amount is identified from the end of the list and deallocated.

A conventional LRU policy therefore requires modification of the linked list in response to every page usage. Modification of the list requires an exclusive lock and therefore contention for the lock and resulting inefficiencies would be significant.

DETAILED DESCRIPTION

Figure 1:
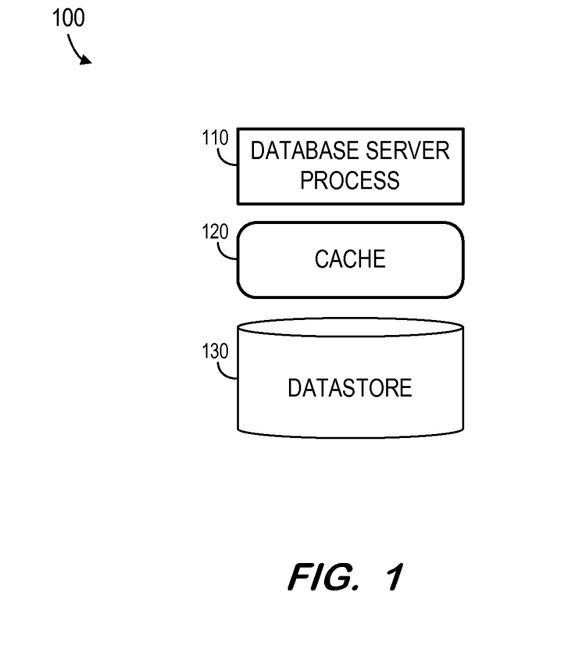
FIG. 1 is a block diagram of a database according to some embodiments.

FIG. 1 is a block diagram of database system 100 according to some embodiments. Database system 100 includes database server process 110, cache 120 and datastore 130.

Database server process 110 may comprise and/or may be implemented by computer-executable program code. For example, database system 100 may comprise one or more hardware devices, including at least one processor to execute program code so as to cause the one or more hardware devices to provide database server process 110.

Cache 120 may be implemented in Random Access Memory (RAM), and datastore 130 may comprise one or more fixed disks. Alternatively, database system 100 may comprise an "in-memory" database, in which both the data of datastore 130 and cache 120 are stored in volatile (e.g., non-disk-based) memory (e.g., RAM).

In contrast to conventional fixed-size caches which store data pages of a fixed size, cache 120 may be capable of storing any objects of any size. In some embodiments, the stored objects may comprise one or more of conventional tabular data pages, row-based table data, columnar table data, dictionaries (e.g., for mapping of identifiers in columnar data to columnar tables), and object data. Each stored object may be identified using a unique identifier. Pointers to each object may be stored in a lock-free hash table hashed by the identifiers in order to provide fast and scalable lookup.

Each cached object may also be associated with one or more properties, including but not limited to: a reference count, a flag indicating whether or not the page has been modified from its "last known good" version, and usage statistics/control information for a replacement policy. Such properties may be maintained by a control block allocated in the cache for each cached object. The control block may include any other information used for cache management, such as the logical page number of the cached object, or a read/write lock for the contents of the object. Logically, the control block may implement a resource header, such that a single "resource" comprises a resource header and a resource proper (i.e., database data).

When a cached object is in-use, each user (i.e., thread) using the object holds a handle to the cached object. The aforementioned reference count reflects a current number of users, and is decremented by each user upon release of the object. Accordingly, a cached object associated with a reference count of zero is not being used.

The replacement policies described below may utilize resource properties in addition to those mentioned above. These resource properties may include a timestamp indicating a time at which the resource was last-used, left and right child pointers to define a position of the resource in a resource queue, and/or a disposition of the resource to provide finer-grained control over the effective cache lifetimes of different types of cached objects.

Database system 100 may communicate with one or more database applications (not shown) over one or more interfaces (e.g., a Structured Query Language (SQL)-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of database system 100 may be received from disparate hardware and software systems, some of which are not interoperational with one another. The systems may comprise a back-end data environment employed in a business or industrial context. The data may be pushed to database system 100 and/or provided in response to queries received therefrom.

Database system 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Although embodiments are described with respect to database system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. Database system 100 may also or alternatively support multi-tenancy by providing multiple logical database systems which are programmatically isolated from one another.

Figure 2:
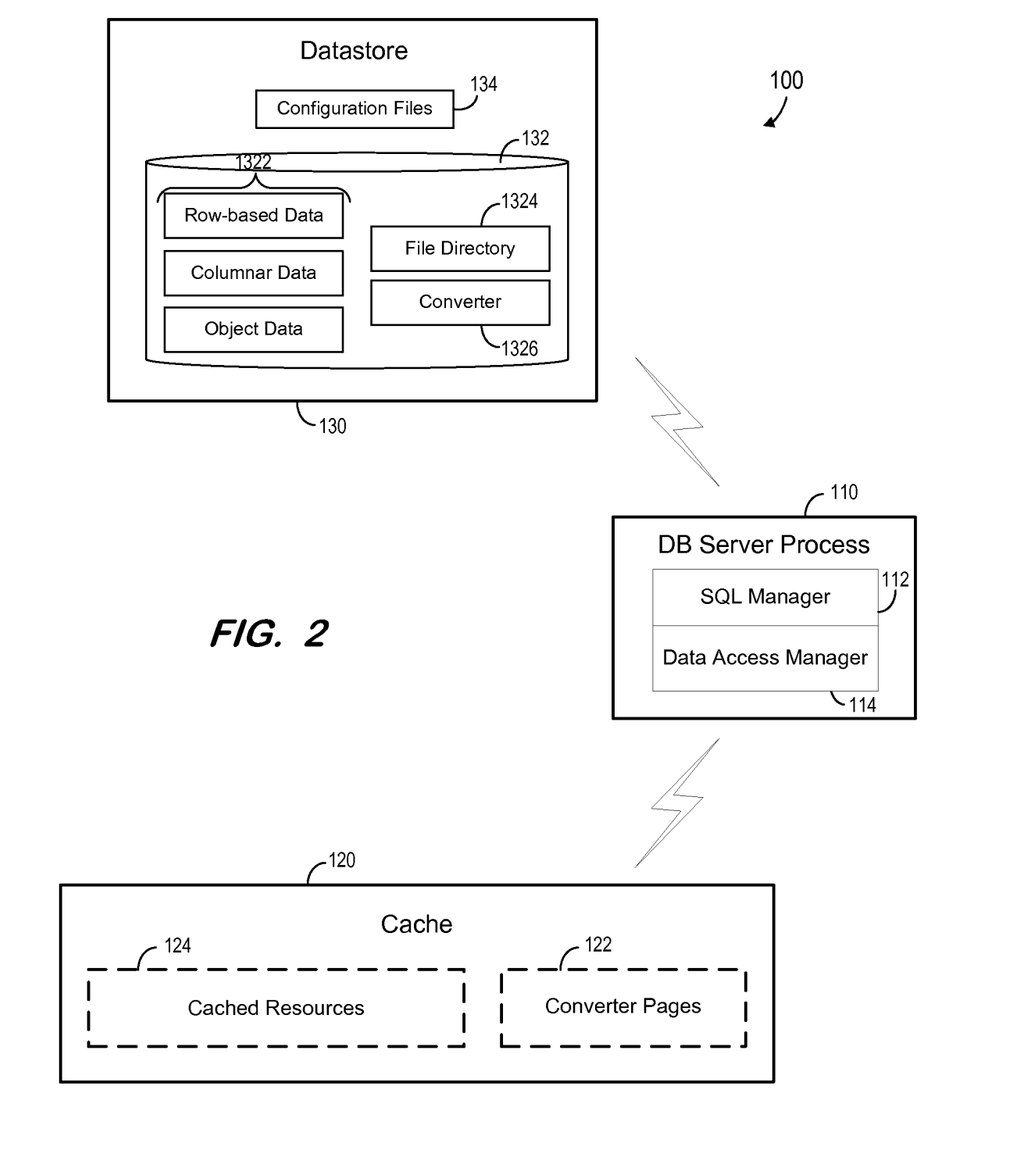
FIG. 2 is a detailed block diagram of a database according to some embodiments.

FIG. 2 is a block diagram of database system 100 according to some embodiments. For purposes of the foregoing description, it will be assumed that datastore 130 comprises only data volume 132. Datastore 130 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or RAM.

Generally, a data volume is subdivided into storage areas known as blocks, and data is stored in the data volume in data pages 1322, each of which has the same size as a block. Accordingly, a particular data page 1322 of datastore 130 may be accessed by referencing the data volume and block address associated with that data page. Data pages 1322 may include application data consisting of tabular data, row-based data, columnar data, object data and associated index entries. In a case that datastore 130 includes more than one data volume, data pages 1322 may be spread across one or more of its data volumes.

Data volume 132 includes file directory 1324 and converter 1326. If datastore 130 includes more than one data volume, file directory 1324 and converter 1326 may be spread across one or more of the data volumes. When a new data page is created, the data page is assigned a unique logical page number. Converter 1326 maps this logical page number to the data volume and block address at which the data page is stored. File directory 1324 maps a file identifier to a logical page number of a corresponding file root page, and the aforementioned database catalog maps each file identifier to associated metadata, including a name of a database object associated with the file identifier. Accordingly, the information of the database catalog and file directory 1324 may be used to determine a logical page number from a name of a database object, for example.

The foregoing process also applies to "in-memory" implementations. However, an identifier of a data volume in which a page is stored might not be utilized in such implementations, as the in-memory datastore might simply comprise addressable memory locations which are not divided into logical data volumes.

Datastore 130 may also include configuration files 134 defining properties of database system 110 (e.g., a size and physical location of each data volume, a maximum number of data volumes in datastore 130, etc.). Moreover, datastore 130 typically includes system files, database parameters, paths, user information and any other suitable information. Datastore 130 may also store a database catalog including metadata describing the database objects that are stored therein.

DB server process 110 may comprise any system for managing a database system that is or becomes known. Generally, DB server process 110 may receive requests for data (e.g., SQL requests from a database application), may retrieve the requested data from datastore 130 or from cache 120, and may return the requested data to the requestor. In some embodiments, DB server process 110 includes SQL manager 112 to process received SQL statements and data access manager 114 to manage access to stored data. DB server process 110 may also perform start-up, logging, recovery, management, optimization, monitoring, indexing, integrity checks and other database-related tasks.

Cache 120 stores various elements of datastore 130 during execution of database system 100. These elements may include recently-accessed data 1322, pages of converter 1326, and/or a log queue. As shown, cache 120 includes converter 122 and cached resources 124. Converter 122 and cached resources 124 are illustrated separately herein for the sake of clarity. However, according to some embodiments, converter 122 and cached resources 124 might not comprise separate, contiguous memory addresses of cache 120. For example, pages of converter 122 may be interspersed among cached resources 124 throughout cache 120.

The pages of converter 1326 are created in cache 120 as converter 122 in order to provide fast access to cached resources 1322. In this regard, a database transaction may require access to a database object stored in cached resources 1322. A file identifier corresponding to the database object is determined based on the database catalog, and a logical page number of a root page of the database object is determined from the file identifier using file directory 1324. If the root page is not already among cached resources 124 of cache 120, converter 122 is traversed to determine a block address of data volume 132 at which the root page is stored, based on the logical page number.

The data page is read from the block address of data volume 132 and is created within cached resources 124 of cache 120. If the data page is modified within cache 120, a log entry describing the modification is recorded, the modified page remains in cache 120, the modified page is designated as modified using the above-mentioned resource properties, and the original "last known good" page remains at the block address of data volume 132 from which the data page was read.

Once the number of modified pages in cache 120 reaches a threshold amount, or after passage of a designated time interval, all pages of cache 120 which are designated as modified are written to data volume 132. The modified page is not written to the block address of data volume 132 from which it was initially read. Rather, the original unmodified page remains designated as a "last known good" page at its block address and the modified page is written to a new block address of data volume 132.

Since converter 1326 of data volume 132 maps logical page numbers to block addresses of data volume 132, converter 1326 must be modified once a corresponding data page is saved to a new location of data volume 132. The modified converter pages are flushed to data volume 132 at the end of a savepoint, particularly after all modified data pages are written to data volume 132. Then, a restart record is created to point to the starting point of the newly-saved converter within data volume 132. The restart record may be stored in any volume of datastore 130.

Figure 3:
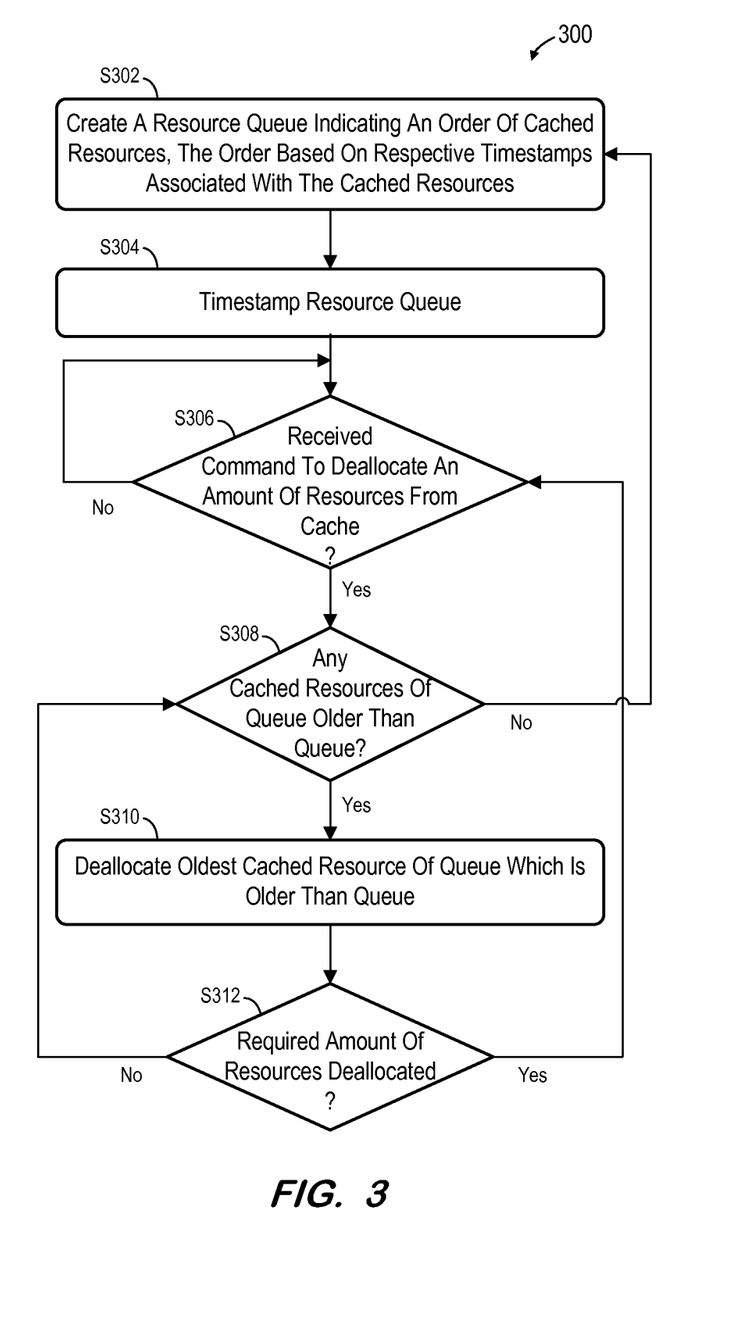
FIG. 3 is a flow diagram of a process according to some embodiments.

FIG. 3 comprises a flow diagram of process 300 according to some embodiments. In some embodiments, various hardware elements of a database execute program code to perform process 300. Process 300 may be performed by DB server process 110 according to some embodiments.

Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A resource queue is initially created at S302. The resource queue indicates an order of cached resources that is based on respective timestamps associated with the cached resources. According to some embodiments, each resource (or data page) stored in cache 120 is associated with a timestamp indicating a time at which the resource was last-used. The timestamp need not be an actual time (e.g., 13:45:02.56 on Jun. 8, 2011), but may comprise any data which is usable to order resources based their relative times of last usage. For example, the timestamp for a resource may simply comprise a value of a continuously-incrementing counter register which is evaluated when the resource's reference count reaches zero.

Figure 4A:
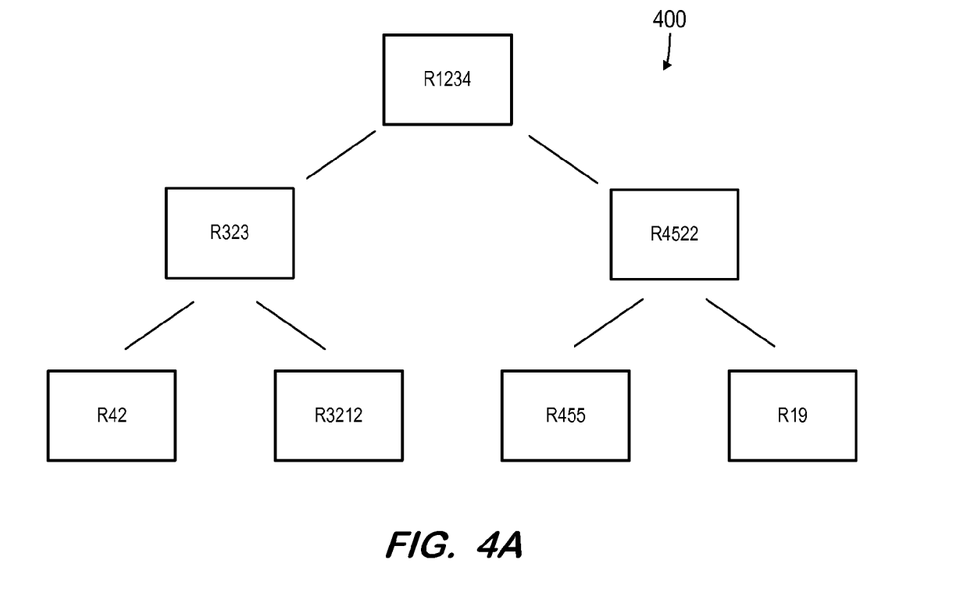
FIGS. 4A through 4D illustrate a resource queue over time according to some embodiments.

According to some embodiments, the resource queue suggests a tree structure as shown in FIG. 4A. Queue 400 represents each resource by its unique identifier, and each resource (except the lowest-level resources R42, R3212, R455 and R19) is associated with a pointer to a lower-left resource in the tree structure and a pointer to a lower-right resource in the tree structure. These two pointers may be defined by the resource header of the resource. In this regard, queue 400 might not exist as an independent data structure, instead it may be an abstract logical entity defined by the pointers of the corresponding resource headers.

As mentioned, resource queue 400 may indicate an order of resources based on their timestamps. According to the embodiment described below, the resources of queue 400 are arranged such that a resource is initially associated with an earlier timestamp than all resources located to the right of the resource. For example, resource R42 is associated with the earliest (i.e., oldest) timestamp and R19 is associated with the most-recent timestamp. Also, the timestamp associated with resource R1234 is older then the timestamps associated with resources R455 and R4552, but more-recent than the timestamps associated with resources R323 and R3212.

In other examples, a timestamp associated with resource R1234 may indicate a later time than the timestamps associated with resources R323 and R4522. Similarly, the timestamp associated with resource R323 may indicate a later time than the timestamps associated with resources R42 and R3212. Some embodiments may reverse this ordering such that resources associated with earlier timestamps are located higher in the tree structure.

The resource queue itself is timestamped at S304. The resource queue timestamp may comprise any data that allows temporal comparison with the timestamps of the cached resources.

Flow cycles at S306 until a command is received to deallocate a particular amount of resources from the cache. In the case of a fixed-size cache, the command may comprise an instruction to reduce the utilization of the cache to a particular percentage of its total capacity, or to deallocate at least a particular percentage or number of bits. In the case of a variable-sized cache, the received command may comprise an instruction to shrink the total cache size by a particular percentage or a particular amount.

After the command is received, it is determined, at S308, whether any cached resources specified in the queue are older than the queue. In this regard, one or more resources of the queue may have been used during the time between creation of the resource queue and reception of the command at S306, with their timestamps being updated accordingly. S308 determines whether any of the resources of the queue are associated with timestamps that are earlier than the queue's timestamp. If not, flow returns to S302 to create a new resource queue as described above.

Figure 4B:
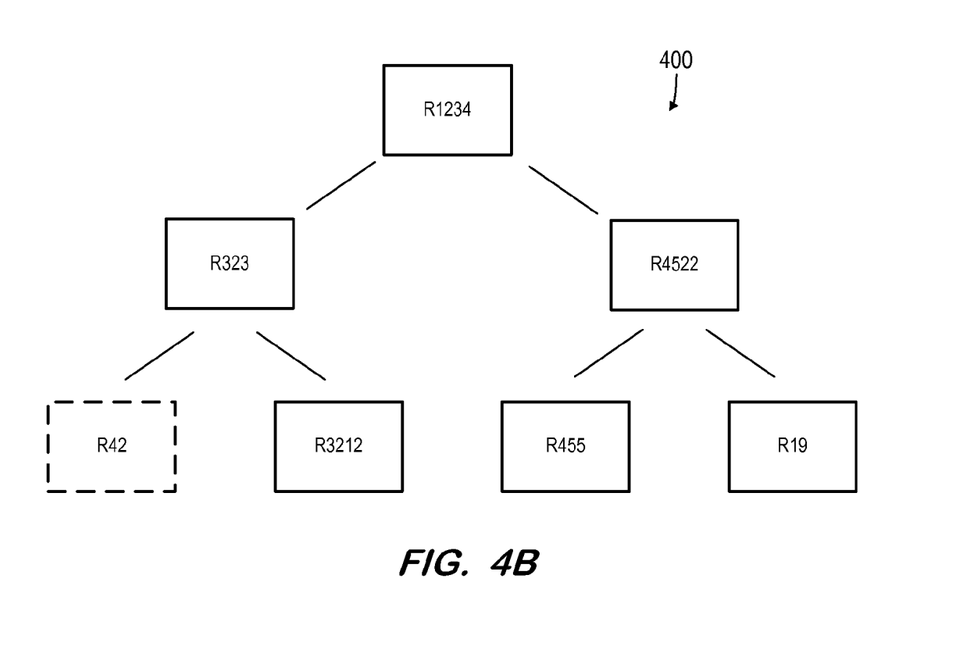

If the determination at S308 is affirmative, flow proceeds to S310 to deallocate the oldest cached resource of the queue which is older than the queue. Using the above-mentioned pointers queue 400 of FIG. 4A may be traversed quickly from its root to its lowest level to identify resource R42, which is assumed in the present example to be the oldest cached resource which is older than queue 400. FIG. 4B illustrates deallocation of resource R42 at S310 according to some embodiments. The pointers of parent resource R323 remain intact to maintain the integrity of resource queue 400, although resource R42 is no longer allocated within the cache.

Flow continues to S312 to determine whether the required amount of resources has been deallocated. If not, flow returns to S308 to determine whether any cached resources of the queue are older than the queue, as described above. Assuming an affirmative determination, flow again arrives at S310 to deallocate the oldest cached resource of the queue which is older than the queue.

Figure 4C:
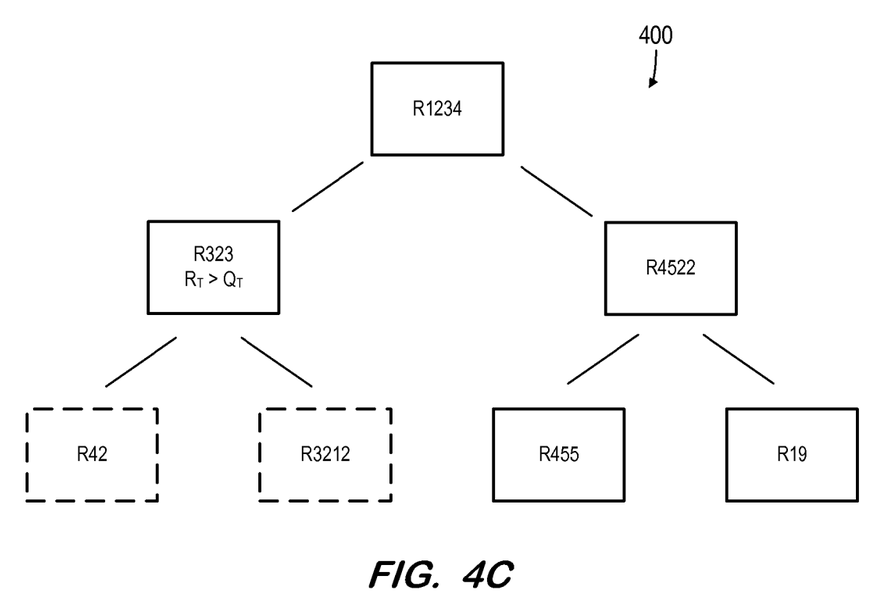

As shown in FIG. 4C, a timestamp associated with resource R323 has been updated during execution of process 300 due to usage of resource R323 sometime after S304. Accordingly, R3212, which may have otherwise been the oldest resource in queue 400, is not deallocated at S310. Instead, resource R3212 is deallocated. Again, the pointers of parent resource R323 remain intact to maintain the integrity of resource queue 400.

Figure 4D:
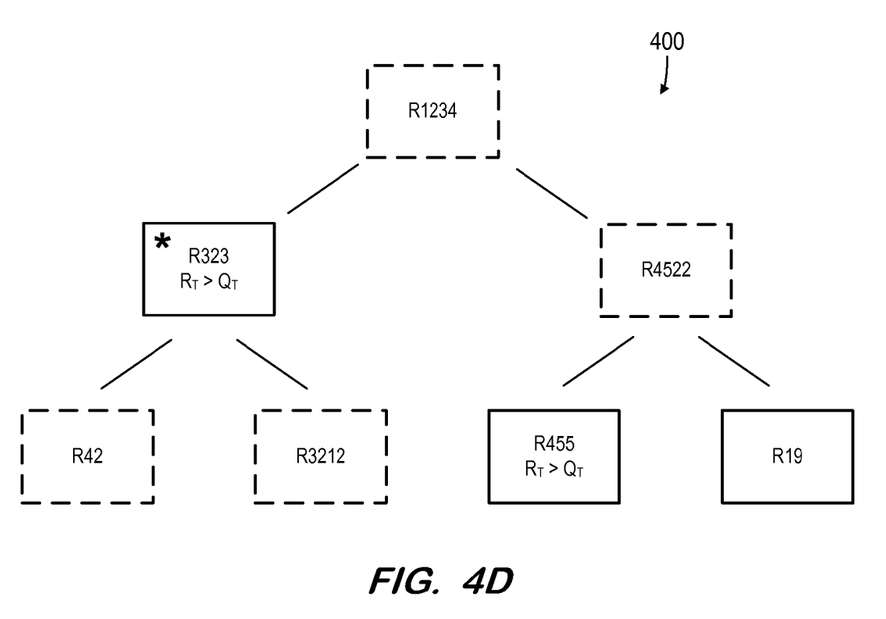

Flow therefore cycles between S308, S310 and S312 until the required amount of resources has been deallocated from the queue. FIG. 4D shows queue 400 after execution of several of such cycles. The resource header of resource R323 has been updated during these cycles to indicate that resource R323 has been modified (e.g., as indicated by *), and to update its timestamp accordingly. Resources R1234 and R4522 have been deallocated, and the timestamp associated with resource R455 has been updated to reflect a recent use.

It will be assumed that the required amount of resources is then determined to have been deallocated at S312. Flow therefore returns to S306 to wait for another command to deallocate an amount of resources from the cache. If such a command is received, flow proceeds to step S308 and continues as described above. With respect to the example of FIG. 4D, resource R19 may be deallocated in response to a next-received command. Notably, queue 400 is not updated or regenerated (i.e., flow does not return to S302) until all the resources of the queue have been deallocated or until all currently-cached resources specified in the queue are associated with timestamps newer than the queue's timestamp. As a result, the number and frequency of locks required to implement a replacement policy may be reduced.

Process 300 treats all types of resources equally. However, in some implementations, certain types of resources may be more desirable to maintain in a cache than others. For example, in an in-memory database system, it may be more important to cache in-memory table data for a columnar engine than to cache a database page.

A replacement policy may be based on a resource disposition assigned to each resource. Examples of resource dispositions may include temporary, permanent, short-term and long-term. Generally, resources having different resource dispositions may be treated differently by the replacement policy.

A resource associated with the temporary resource disposition may be automatically removed from the cache when its reference count reaches zero. If such a resource was modified in the cache, it is first flushed to persistent storage prior to removal. Examples of resources which may be associated with the temporary resource disposition include database pages storing columnar data after a columnar merge, since they are not required for query processing after the merge, only for re-loading the table.

A resource associated with the permanent resource disposition is never removed by a replacement policy and is not included in a resource queue created as described herein. Such a resource must be removed from the cache explicitly. Database pages which are used to store in-memory row data (e.g., containing columnar table metadata) may be assigned the permanent resource disposition, since such pages are accessed using memory pointers and therefore cannot be simply removed.

Figure 5A:
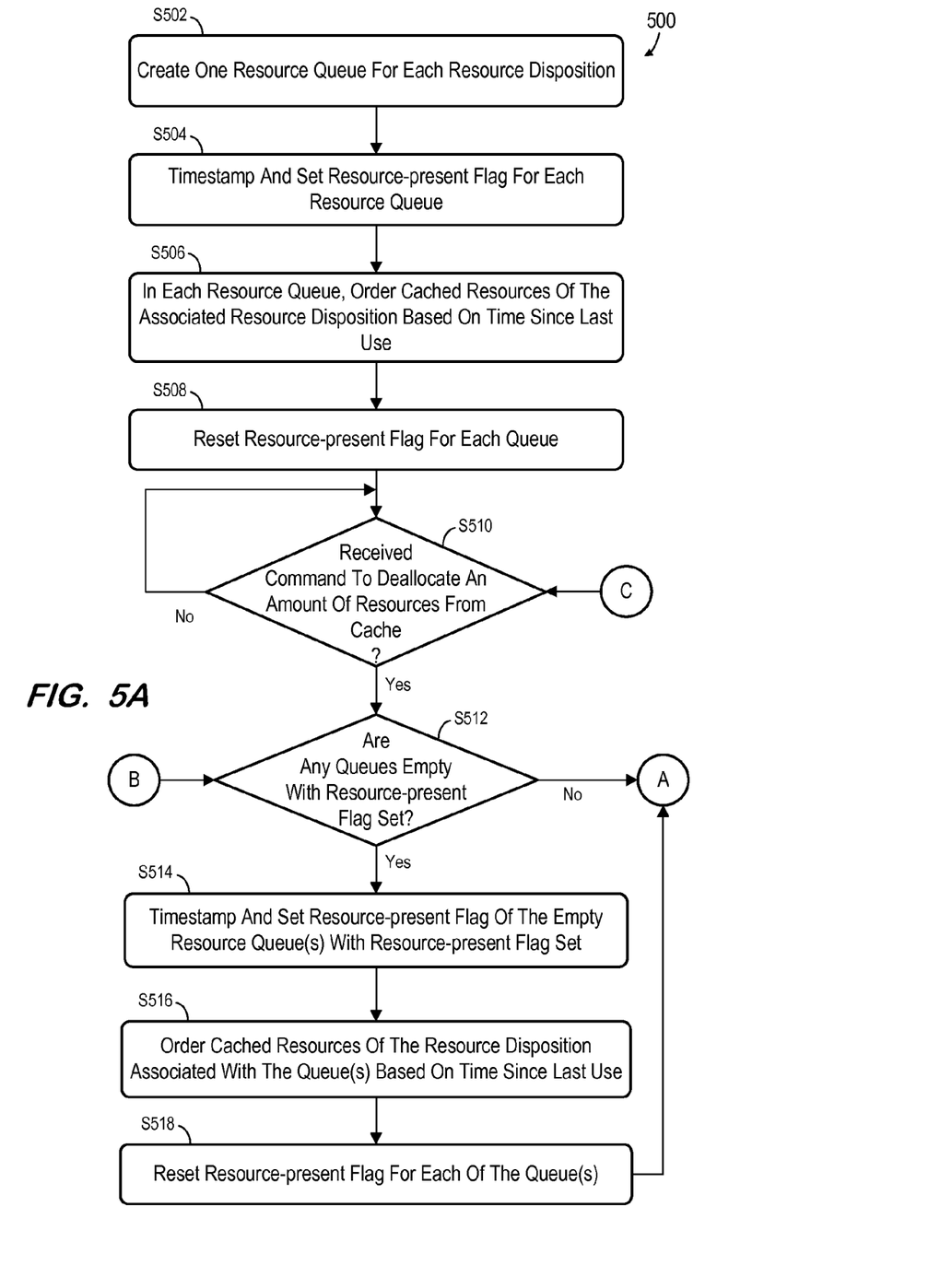
FIGS. 5A and 5B comprise a flow diagram of a process according to some embodiments.
Figure 5B:
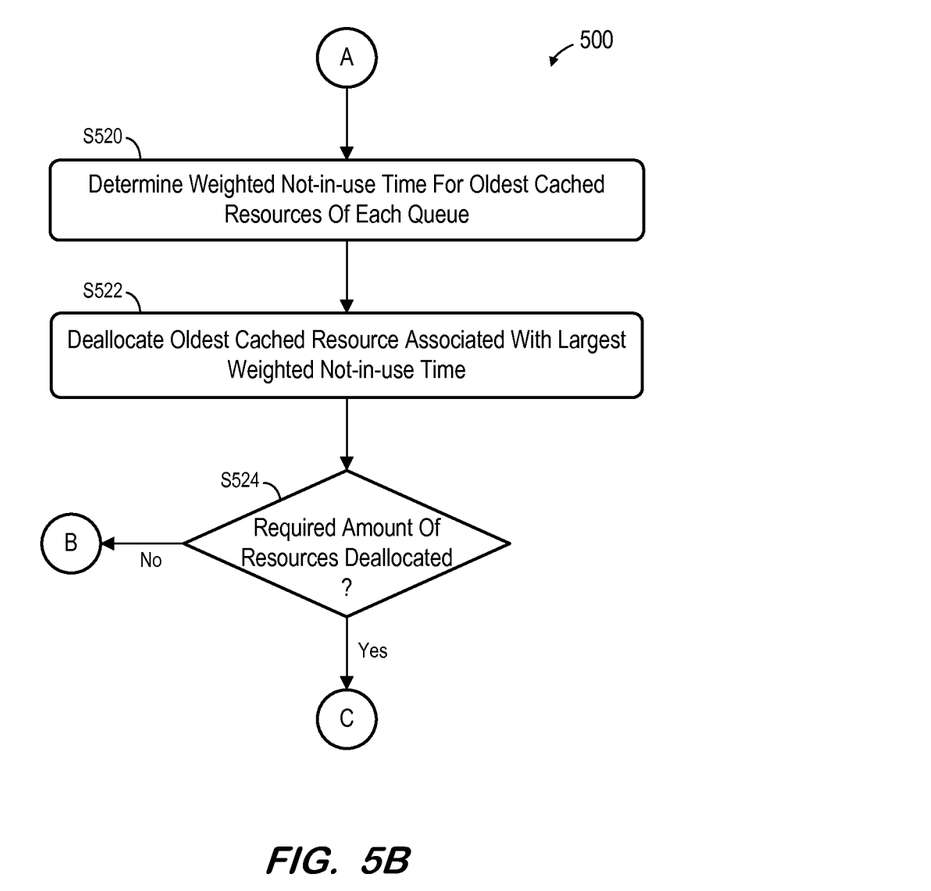

Process 500 implements a replacement policy which supports more than one type of resource disposition. Process 500 will be described with respect to an example including two resource dispositions, but embodiments are not limited thereto. Initially, at S502, one resource queue is created for each resource disposition. Each resource queue is then time-stamped and a "resource present" flag for each resource queue is set.

Next, at S506, cached resources of each resource disposition are ordered within their corresponding resource queue based on their respective times since last use. This order is determined based on the associated timestamps. Therefore, in the present example, two resource queues exist after completion of S506, with the first resource queue indicating an order of cached resources of a first resource type, and with the second resource queue indicating an order of cached resources of a second resource type. Each queue may suggest a tree structure using pointers as described above with respect to process 300.

The resource-present flag of each queue is reset at S508. During subsequent execution of process 500, the resource-present flag of a queue is set if the reference count associated with the resource reaches zero due to its release by a using thread. Updating in this sense also includes caching of a new resource associated with the resource disposition.

Flow cycles at S510 until a command is received to deallocate a particular amount of resources from the cache. After the command is received, it is determined, at S512, whether any of the queues are empty (i.e., all resources of the queue have been deallocated) and associated with a set resource-present flag (i.e., the cache includes one or more resources associated with the resource disposition). If so, these queues are rebuilt by executing S514 through S518, which are analogous to S504 through S508 described above. Flow then proceeds to S520 from S518, or from S512 if the determination therein is negative.

A weighted not-in-use time is determined for the oldest resources of each queue. For example, a weight of 10 may be assigned to resources of a short-term disposition queue, while resources of a long-term disposition queue may be assigned a weight of 1. Moreover, a not-in-use time may be determined for the oldest cached resource in each queue by subtracting the timestamp of the oldest cached resource from the current timestamp. The determined not-in-use time of each oldest cached resource is then multiplied by the weight assigned to its resource disposition to determine its weighted not-in-use time. For example, if the oldest cached "short-term" resource has a not-in-use time of 5 s and the oldest cached "long-term" resource has a not-in-use time of 20 s, the weighted not-in-use time for the short-term resource is 5 s×10=50 s and the weighted not-in-use time for the long-term resource is 20 s×1=20 s.

Next, at S522, the oldest cached resource which is associated with the largest weighted not-in-use time is deallocated. Considering the above example, the short term resource associated with the weighted not-in-use time of 50 s is deallocated at S522. The pointers of the resource's header, as well as any pointers to the resource, remain intact to maintain the integrity of its resource queue. Flow then continues to S524 to determine whether the required amount of resources has been deallocated. If not, flow returns to S512 to determine whether any of the queues are empty and associated with a set resource-present flag and, if not, to deallocate another resource as described above.

If the determination at S524 is positive, flow returns to S510 to wait for another command to deallocate an amount of resources from the cache. Again, the resource queues are not updated or regenerated until all the resources of the queue have been deallocated. Process 500 therefore reduces the number and frequency of locks required to implement a replacement policy, while also providing a policy which may consider the relative priority of different types of resources.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:
1. A computer-implemented method for a database system, comprising:
creating a first resource queue indicating an order of resources stored in a memory, each stored resource having a respective timestamp indicative of a last usage and the order being based on the respective timestamps associated with the stored resources;
associating, by a processor of the computer, the first resource queue with a first queue timestamp;
receiving a first command to deallocate a first amount of stored resources from the memory;
determining, by the processor, that a first stored resource indicated by the first resource queue is associated with a timestamp earlier than the first queue timestamp;
deallocating the first stored resource from the memory;
receiving a second command to deallocate a second amount of stored resources from the memory;

determining, by the processor, that the first resource queue indicates none of the stored resources are associated with a timestamp earlier than the first queue timestamp; and in response to the determination that the first resource queue indicates none of the stored resources are associated with a timestamp earlier than the first queue timestamp:

creating a second resource queue indicating a second order of second resources stored in the memory, associating, by the processor, the second resource queue with the second queue timestamp;

determining, by the processor, that a second stored resource indicated by the second queue is associated with a timestamp earlier than the second queue timestamp; and deallocating the second stored resource from the memory, each of the stored second resources having a respective timestamp indicative of a last usage and the second order being based on respective second timestamps associated with the stored second resources, wherein the second queue is not updated until all of the resources stored therein have been at least one of: deallocated and the second resource queue indicates none of the stored second resources are associated with a timestamp earlier than a second queue timestamp associated with the second resource queue.

2. A method according to claim 1, further comprising:
prior to receiving the second command, receiving a third command to deallocate a third amount of stored resources from the memory;
determining, by the processor, that a third stored resource indicated by the first resource queue is associated with a timestamp earlier than the first queue timestamp; and
deallocating the third stored resource from the memory.

3. A method according to claim 1, wherein the resource queue comprises a tree structure.

4. A method according to claim 3, wherein a stored resource is associated with a respective resource header comprising a left pointer member to indicate a first child resource of the stored resource within the tree structure and a right pointer member to indicate a second child resource of the stored resource within the tree structure.

5. A method according to claim 1, wherein determining that the first resource queue indicates none of the stored resources are associated with a timestamp earlier than the first queue timestamp further comprises:
determining that the memory stores resources of the first disposition type.

6. A non-transitory computer-readable medium storing program code, the program code executable by a computer, the program code comprising:
code to create a first resource queue indicating an order of resources stored in a memory, each stored resource having a respective timestamp indicative of a last usage and the order being based on the respective timestamps associated with the stored resources;
code to associate the first resource queue with a first queue timestamp;
code to receive a first command to deallocate a first amount of stored resources from the memory;
code to determine that a first stored resource indicated by the first resource queue is associated with a timestamp earlier than the first queue timestamp;
code to deallocate the first stored resource from the memory;
code to receive a second command to deallocate a second amount of stored resources from the memory;
code to determine that the first resource queue indicates none of the stored resources are associated with a timestamp earlier than the first queue timestamp; and
code to in response to the determination that the first resource queue indicates none of the stored resources are associated with a timestamp earlier than the first queue timestamp:
create a second resource queue indicating a second order of second resources stored in the memory;
associate the second resource queue with the second queue timestamp;
determine that a second stored resource indicated by the second queue is associated with a timestamp earlier than the second queue timestamp; and
deallocate the second stored resource from the memory, each of the stored second resources having a respective timestamp indicative of a last usage and the second order based on respective second timestamps associated with the stored second resources, wherein the second queue is not updated until all of the resources stored therein have been at least one of: deallocated and the second resource queue indicates none of the stored second resources are associated with a timestamp earlier than a second queue timestamp associated with the second resource queue.

7. A medium according to claim 6, the program code further comprising:
code to receive, prior to receiving the second command, a third command to deallocate a third amount of stored resources from the memory;
code to determine that a third stored resource indicated by the first resource queue is associated with a timestamp earlier than the first queue timestamp; and
code to deallocate the third stored resource from the memory.

8. A medium according to claim 6, wherein the resource queue comprises a tree structure.

9. A medium according to claim 6, wherein a stored resource is associated with a respective resource header comprising a left pointer member to indicate a first child resource of the stored resource within the tree structure and a right pointer member to indicate a second child resource of the stored resource within the tree structure.

10. A medium according to claim 6, wherein the code to determine that the first resource queue indicates none of the stored resources are associated with a timestamp earlier than the first queue timestamp further comprises:
code to determine that the memory stores resources of the first disposition type.

11. A system comprising:
a database cache;
a memory storing processor-executable process steps; and
a processor to execute the processor-executable process steps to cause the system to:
create a first resource queue indicating an order of resources stored in the database cache, each stored resource having a respective timestamp indicative of a last usage and the order based on the respective timestamps associated with the stored resources;
associate the first resource queue with a first queue timestamp;
receive a first command to deallocate a first amount of stored resources from the database cache;

determine that a first stored resource indicated by the first resource queue is associated with a timestamp earlier than the first queue timestamp;

deallocate the first stored resource from the database cache;

receive a second command to deallocate a second amount of stored resources from the database cache;

determine that the first resource queue indicates none of the stored resources which associated with a timestamp earlier than the first queue timestamp; and in response to the determination that the first resource queue indicates none of the stored resources are associated with a timestamp earlier than the first queue timestamp:

create a second resource queue indicating a second order of second resources stored in the database cache;

associate the second resource queue with the second queue timestamp;

determine that a second stored resource indicated by the second queue is associated with a timestamp earlier than the second queue timestamp; and deallocate the second stored resource from the database cache, each stored second resource having a respective timestamp indicative of a last usage and the second order being based on respective second timestamps associated with the stored second resources, wherein the second queue is not updated until all of the resources stored therein have been at least one of: deallocated and the second resource queue indicates none of the stored second resources are associated with a timestamp earlier than a second queue timestamp associated with the second resource queue.

12. A system according to claim 11, the processor to execute the processor-executable process steps to cause the system to:

receive, prior to receiving the second command, a third command to deallocate a third amount of stored resources from the database cache;

determine that a third stored resource indicated by the first resource queue is associated with a timestamp earlier than the first queue timestamp; and deallocate the third stored resource from the database cache.

13. A system according to claim 11, wherein the resource queue comprises a tree structure.

14. A system according to claim 13, wherein a stored resource is associated with a respective resource header comprising a left pointer member to indicate a first child resource of the stored resource within the tree structure and a right pointer member to indicate a second child resource of the stored resource within the tree structure.

* * * * *